US012620581B2

(12) United States Patent
Zhang et al.

(10) Patent No.: US 12,620,581 B2
(45) Date of Patent: May 5, 2026

(54) ELECTRODE PIECE AND BATTERY

(71) Applicant: Zhuhai CosMX Battery Co., Ltd., Zhuhai (CN)

(72) Inventors: Shuanghu Zhang, Zhuhai (CN); Jian Zhang, Zhuhai (CN); Leiming Sun, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 530 days.

(21) Appl. No.: 18/060,570

(22) Filed: Dec. 1, 2022

(65) Prior Publication Data

US 2023/0115059 A1 Apr. 13, 2023

Related U.S. Application Data

(63) Continuation of application No. PCT/CN2021/139024, filed on Dec. 17, 2021.

(30) Foreign Application Priority Data

Dec. 30, 2020 (CN) .......................... 202011628643.2

(51) Int. Cl.
H01M 4/36 (2006.01)
H01M 4/133 (2010.01)
(Continued)

(52) U.S. Cl.
CPC ........... H01M 4/366 (2013.01); H01M 4/133 (2013.01); H01M 4/134 (2013.01); H01M 4/64 (2013.01);
(Continued)

(58) Field of Classification Search
CPC ...... H01M 4/366; H01M 4/133; H01M 4/131; H01M 4/136; H01M 2004/027;
(Continued)

(56) References Cited

U.S. PATENT DOCUMENTS

| 3,988,564 A | 10/1976 | Garvin et al. |
| 4,862,318 A | 8/1989 | Galvagni et al. |
| 2020/0020921 A1 | 1/2020 | Shiozaki et al. |

FOREIGN PATENT DOCUMENTS

| CN | 204464391 U | 7/2015 |
| CN | 105261727 A | 1/2016 |
(Continued)

OTHER PUBLICATIONS

The first Office Action received in corresponding CN Application 202011628643.2, mailed Oct. 9, 2021.
(Continued)

*Primary Examiner* — Laura Weiner
(74) *Attorney, Agent, or Firm* — Kilpatrick Townsend & Stockton LLP

(57) ABSTRACT

The present disclosure provides an electrode piece and a battery. The electrode piece includes a current collector and a functional layer located on a first surface of the current collector, the first surface is provided with a tab, and the functional layer is composed of a normal area away from the tab and a recessed area near the tab, and a thickness of the recessed area is less than a thickness of the normal area. The present disclosure can effectively prevent problems such as excessive thickness of part of a cell near the tab, thereby improving battery qualities such as safety and charging/ discharging rate.

20 Claims, 1 Drawing Sheet

(51) Int. Cl.

| | | |
|---|---|---|
| *H01M 4/134* | (2010.01) |
| *H01M 4/64* | (2006.01) |
| *H01M 4/70* | (2006.01) |
| *H01M 10/0525* | (2010.01) |
| *H01M 4/02* | (2006.01) |
| *H01M 4/136* | (2010.01) |
| *H01M 4/38* | (2006.01) |
| *H01M 4/48* | (2010.01) |
| *H01M 4/485* | (2010.01) |
| *H01M 4/583* | (2010.01) |

(52) U.S. Cl.
CPC ......... *H01M 4/70* (2013.01); *H01M 10/0525* (2013.01); *H01M 2004/027* (2013.01); *H01M 4/136* (2013.01); *H01M 4/386* (2013.01); *H01M 4/48* (2013.01); *H01M 4/485* (2013.01); *H01M 4/583* (2013.01)

(58) Field of Classification Search
CPC ....... H01M 2004/028; H01M 10/0525; H01M 4/70; H01M 4/64; H01M 4/583; H01M 4/48; H01M 4/386; H01M 4/134; H01M 4/485
See application file for complete search history.

(56) References Cited

FOREIGN PATENT DOCUMENTS

| | | | |
|---|---|---|---|
| CN | 105742565 | A | 7/2016 |
| CN | 110739437 | A | 1/2020 |
| CN | 210110986 | U | 2/2020 |
| CN | 110943201 | A | 3/2020 |
| CN | 210156503 | U | 3/2020 |
| CN | 210443619 | U | 5/2020 |
| CN | 211088397 | U | 7/2020 |
| CN | 211507765 | U | 9/2020 |
| CN | 111816838 | A | 10/2020 |
| CN | 112750978 | A | 5/2021 |
| CN | 112802992 | A | 5/2021 |
| CN | 112820852 | A | 5/2021 |
| GB | 2072930 | A | 10/1981 |
| JP | H09185960 | A | 7/1997 |
| JP | 2010055906 | A | 3/2010 |
| JP | 2013089604 | A | 5/2013 |
| JP | 2017134997 | A | 8/2017 |
| JP | 6734059 | B2 | 8/2020 |
| WO | 2017149927 | A1 | 9/2017 |
| WO | 2018179885 | A1 | 10/2018 |
| WO | 2018209762 | A1 | 11/2018 |
| WO | 2019073595 | A1 | 4/2019 |
| WO | 2019167559 | A1 | 9/2019 |
| WO | 2019193870 | A1 | 10/2019 |

OTHER PUBLICATIONS

The Notification to Grant Patent Right for Invention received in corresponding CN Application 202011628643.2, mailed Feb. 14, 2022.

The international search report and written opinion received in corresponding International Application PCT/CN2021/139024, mailed Mar. 15, 2022.

Office Action of Japanese Patent No. 2022-574383 Mailed Jan. 19, 2024.

Notice of Allowance of Japanese Patent No. 2022-574383 Mailed Jul. 10, 2024.

European Search Report of EP21913951.6 Dated Jul. 3, 2024.

The First Office Action issued in Chinese corresponding application No. 202180093956.9 mailed on Nov. 27, 2025, 13 pages.

ELECTRODE PIECE AND BATTERY

CROSS-REFERENCE TO RELATED APPLICATION

The present application is a continuation of International Application No. PCT/CN2021/139024, filed on Dec. 17, 2021, which claims priority to Chinese Patent Application No. 202011628643.2, filed with China National Intellectual Property Administration on Dec. 30, 2020, entitled "Electrode Piece and Battery", both of which are hereby incorporated by reference in their entireties.

TECHNICAL FIELD

The present disclosure relates to the field of batteries, and in particular, to an electrode piece and a battery adopting the same.

BACKGROUND

Lithium-ion battery is widely used in consumer electronic products and electric vehicles due to its advantages of environment-friendly, high working voltage, high specific capacity and long cycle life, to improve qualities of the lithium-ion battery, such as fast charging capability as well as life and safety of the lithium-ion battery, and thus it is of great significance for the practical promotion and application of the battery.

Coiled battery is a type of commonly used battery and is mainly prepared by laminating a positive electrode piece, a separator and a negative electrode piece and coiling to form a cell, and then subjecting to liquid injection, packaging, formation and other processes. However, a conventional cell is usually too thick at a position near a tab of an electrode piece. Especially when adopting an electrode piece in which the tab is designed in middle (rather than an end) of the electrode piece, due to the requirement for attaching an adhesive tape to the tab and other reasons, part of the cell near the tab is more likely to be too thick, exceeding the standard of thickness, resulting in the precipitation of lithium, the increase of battery internal resistance and other problems, which is not conducive to the safety of the battery, volume energy density of cell, and charging and discharging rate and other performance.

SUMMARY

The present disclosure provides an electrode piece to at least solve the problems existing in the prior art, such as excessive thickness of the cell near the tab and resulting low safety, poor charging and discharging rate performance of the battery and the like.

The present disclosure further provides a battery that adopts the above electrode piece, to effectively avoid the problem of excessive thickness of the cell near the tab, and has a good charging and discharging rate performance, safety and long service life.

In one aspect, the present disclosure provides an electrode piece, including a current collector and a functional layer located on a first surface of the current collector, where the first surface is provided with a tab, the functional layer on the first surface is composed of a normal area away from the tab and a recessed area near the tab, and a thickness of the recessed area is less than a thickness of the normal area.

According to an embodiment of the present disclosure, the functional layer includes a bottom coating layer and an active material layer, the bottom coating layer is located between a surface of the current collector and the active material layer, raw materials of the bottom coating layer include an active material, a binder and a conductive agent, raw materials of the active material layer include an active material, a binder and a conductive agent, and a content of the binder in the bottom coating layer is higher than a content of the binder in the active material layer.

According to an embodiment of the present disclosure, a thickness of the recessed area is 5-125 $\mu$m less than a thickness of the normal area.

According to an embodiment of the present disclosure, a thickness of the bottom coating layer in the recessed area is 0-15 $\mu$m, a thickness of the active material layer in the recessed area is 0-105 $\mu$m; and/or, a thickness of the bottom coating layer in the normal area is 5-15 $\mu$m, and a thickness of the active material layer in the normal area is 90-110 $\mu$m.

According to an embodiment of the present disclosure, a width of the recessed area is 3-50 mm.

According to an embodiment of the present disclosure, the bottom coating layer is a porous structure with porosity of 20%-45%; and/or, the active material layer is a porous structure with a porosity of 25%-50%.

According to an embodiment of the present disclosure, among the raw materials of the bottom coating layer, a mass content of the active material is 49-94%, a mass content of the binder is 4-50%, a mass content of the binder is 1-5%; and/or, among the raw materials of the active material layer, a mass content of the active material is 93-96%, a mass content of the binder is 0.9-1.5%, and a mass content of the conductive agent is 1-3%.

According to an embodiment of the present disclosure, the electrode piece is a positive electrode piece, and the active material includes at least one of lithium cobaltate, lithium manganate, lithium nickelate, lithium nickel cobalt manganate, lithium ferrous phosphate, lithium iron manganese phosphate, lithium vanadium phosphate, lithium vanadyl phosphate, lithium-rich manganese-based material, lithium nickel cobalt aluminate and lithium titanate.

According to an embodiment of the present disclosure, the electrode piece is a negative electrode piece, and the active material includes at least one of graphite, mesocarbon microbead, soft carbon, hard carbon, silicon material, silicon oxide material, silicon carbon material and lithium titanate materials.

In another aspect, the present disclosure provides a battery, including the above electrode piece.

The electrode piece provided by the present disclosure has a good safety through the above special structural design and when it is applied to the battery, the problems such as excessive thickness of part of the cell near the tab can be effectively avoided, and thus the quality of the battery, such as safety and charging and discharging rate, can be improved: the battery that adopts the above electrode piece provided by the present disclosure has a good safety, charging and discharging rate and other performance, and has greater practical significance in industry.

ILLUSTRATION OF REFERENCE SIGNS

1: current collector; 2: bottom coating layer; 3: active material layer; 31: normal area; 32: recessed area; 4: tab; 5: adhesive tape; 6: uncoated area; 7: negative electrode tab; 8: engraved area; 9: reserved tab position; 10: nonengraved area; H1: depth of recessed area; H2: distance from upper surface of adhesive tape to surface of normal area.

DESCRIPTION OF EMBODIMENTS

In order to enable those skilled in the art to better understand the solution of the present disclosure, the following describes the present disclosure in detail in combination with the accompanying drawings.

Figure 1:
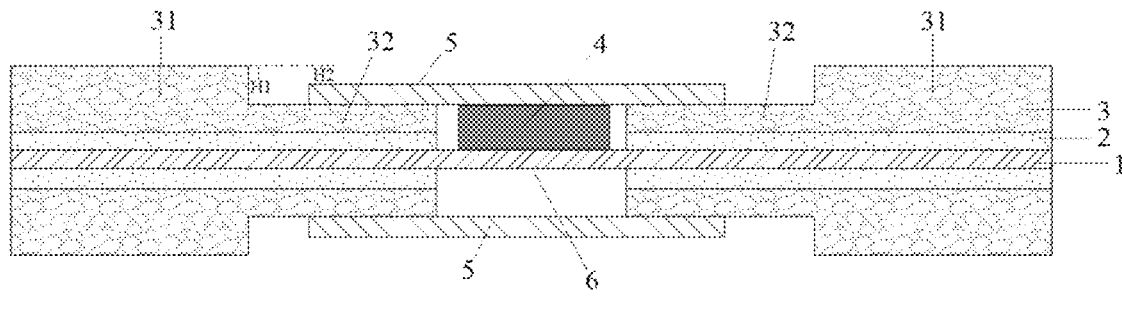
FIG. 1 is a schematic structural diagram of an electrode piece according to an embodiment of the present disclosure.

In one aspect, the present disclosure provides an electrode piece, and as shown in FIG. 1, the electrode piece includes a current collector 1 and a functional layer located on a first surface of the current collector 1, the first surface is provided with a tab 4, and the functional layer located on the first surface is composed of a normal area 31 away from the tab and a recessed area 32 near the tab, and a thickness of the recessed area 32 is less than a thickness of the normal area.

The electrode piece provided by the present disclosure, through the above recessed area design, can effectively avoid the problems such as excessive thickness at a position near the tab in the cell formed by the electrode piece, and thus ensure safety and charging and discharging rate and other performance of the battery.

The functional layer above includes a bottom coating layer 2 and an active material layer 3, the bottom coating layer 2 is located between a surface of the current collector 1 and the active material layer 3, raw materials of the bottom coating layer 2 includes an active material, a binder and a conductive agent, raw materials of the active material layer 3 includes an active material, a binder and a conductive agent, and a content of the binder in the bottom coating layer 2 is higher than a content of the binder in the active material layer 3. The above bottom coating layer (or safety coating layer) has a high adhesion force to the surface of the current collector, which can further improve the safety and other properties of the electrode piece.

Specifically, in the present disclosure, the tab 4 may be located in middle (rather than end) of the electrode piece, and the functional layer is arranged around the tab. In general, a thickness of the tab 4 is not greater than a thickness of the recessed area 32, that is, on the surface (i.e., the first surface) the current collector provided with the tab; and with the surface of the current collector as a reference, a height of the tab 4 is not greater than a height of the recessed area 32.

In the present disclosure, the function layer can only be arranged on the first surface of the current collector 1, or the function layer also can be arranged on a second surface opposite to the first surface at the same time (i.e., the functional layer can be arranged on both positive and negative surfaces of the current collector), the latter is preferred, which can further improve the energy density and other characteristics of the electrode piece. When the two surfaces are provided with the functional layer, a part of the second surface corresponding to the tab can be coated with the functional layer, or is an uncoated area without coating, preferably an uncoated area without coating, which is more conducive to avoiding a phenomenon of excessive thickness of the cell and also is more conducive to manufacture of the electrode piece. In a specific embodiment, when both surfaces of the current collector 1 are provided with the functional layer, the second surface is provided with an uncoated area 6, and the uncoated area 6 corresponds to the position of the tab 4 of the first surface, and the functional layer of the second surface may not be provided with a recessed area, or the recessed area may also be provided at a position near the uncoated area 6 (that is, the functional layer of the second surface includes a recessed area close to the uncoated area 6 and a normal area away from the uncoated area 6). Parameters, such as shape, area size and thickness, of the recessed area of the first surface and the recessed area of the second surface may be the same or different, preferably the same.

In the present disclosure, a thickness of the bottom coating layer in the normal area 31 and a thickness of the bottom coating layer in the recessed area 32 may be the same or different, as long as it is satisfied that a thickness of the recessed area 32 is less than a thickness of the normal area 31, that is, depth of the recessed area, H1=thickness of the normal area-thickness of the recessed area, H1>0. According to the study of the present disclosure, the thickness of the recessed area can generally be 5-125 μm less than the thickness of the normal area, that is, H1 is 5-125 μm, and further can be 10-125 μm, for example, 10-100 μm or 10-90 μm or 10-80 μm or 10-70 μm or 10-65 μm or 20-65 μm or 30-65 μm or 40-65 μm or 45-65 μm or 50-65 μm or 55-65 μm or 60-65 μm.

The thickness of the recessed area 32 is substantially equal to the sum of the thickness of the bottom coating layer of the recessed area 32 and the thickness of the active material layer of the recessed area 32. In a preferred embodiment, the thickness of the bottom coating layer of the recessed area may be 0-15 μm, for example, 5-12 μm, and the thickness of the active material layer of the recessed area may be 0-105 μm, for example, 45-105 μm.

Specifically, in an embodiment of the present disclosure, the thickness of the recessed area is 0-125 μm, further 0-120 μm, and more further 50-112 μm, such as 50 μm, 57 μm, 63 μm, 74 μm, 90 μm, 101 μm, 110 μm, or 112 μm.

The thickness of the normal area 31 of the present disclosure can be arranged according to coating layer thickness of the conventional electrode piece in the field, and the thickness of the normal area 31 is substantially equal to the sum of the thickness of the bottom coating layer of the normal area and the thickness of the active material layer of the normal area. In a preferred embodiment, the thickness of the bottom coating layer of the normal area is 5-15 μm, and further can be 5-12 μm, for example, 5-8 μm, which is beneficial to make the electrode piece have both good safety and low internal resistance; and the thickness of the active material layer of the normal area is 90-110 μm, which is beneficial to further improve the energy density of the electrode piece and other performance.

Further, a width of the recessed area 32 may generally be 3-50 mm and further 3-30 mm, such as 10-30 mm or 20-30 mm or 25-30 mm.

In general, the bottom coating layer 2 is a porous structure with a porosity of 20%-45%; and/or, the active material layer 3 is a porous structure with a porosity of 25%-50%.

After further study, among the raw materials of the bottom coating layer 2, a mass content of the active material is 49-94%; and/or, a mass content of the binder is 4-50%, and a mass content of the conductive agent is 1-5%: among the raw materials of the active material layer 3, a mass content of the active material is 93-96%, such as 94-96%; and/or, a mass content of the binder is 0.9-1.5%, such as 2-3.5%, and a mass content of the conductive agent is 1-3%, such as 1-2%.

In the present disclosure, the active material, the binder, and the conductive agent all can be conventional materials in this field, such as the binder may include at least one of polyvinylidene fluoride, vinylidene fluoride-hexafluoropro-pylene copolymer, polyamide, polyacrylonitrile, polyacry-late, polyacrylic acid, polyacrylic acid salt, carboxymethyl-cellulose sodium, polyvinyl pyrrolidone, polyvinyl ether, polymethyl methacrylate, polytetrafluoroethylene, poly-hexafluoropropylene and styrene-butadiene rubber; and the conductive agent may include at least one of carbon black, carbon fiber, carbon nanotube, graphite, graphene, metal material and conductive ceramic material.

Specifically, the electrode piece can be a positive elec-trode piece or a negative electrode piece. For example, in an embodiment, the electrode piece is a positive electrode piece, the active material can be lithium-containing active material and other conventional positive electrode active material in this field, such as at least one of lithium cobaltate, lithium manganate, lithium nickelate, lithium nickel cobalt manganate, lithium ferrous phosphate, lithium iron manga-nese phosphate, lithium vanadium phosphate, lithium vanadyl phosphate, lithium-rich manganese-based material, and lithium nickel cobalt aluminate, and the current collec-tor can be an aluminum foil and other conventional positive electrode current collector in the field. In another embodi-ment, the electrode piece is a negative electrode piece, the active material may include at least one of graphite, meso-carbon microbead, soft carbon, hard carbon, silicon material, silicon oxide material, silicon carbon material and lithium titanate material, and the current collector can be a copper foil and other conventional negative electrode current col-lector in the field.

When the electrode piece is a negative electrode piece, the raw materials of the bottom coating layer 2 and/or the raw materials of the active material layer 3 can further include a dispersant, a mass content of the dispersant in the bottom coating layer 2 can be 1.5-2.5%, a mass content of the dispersant in the active material layer 3 can be 1.5-2.5%, the dispersant can be sodium carboxymethyl cellulose (CMC) and other commonly used dispersant.

Figure 3:
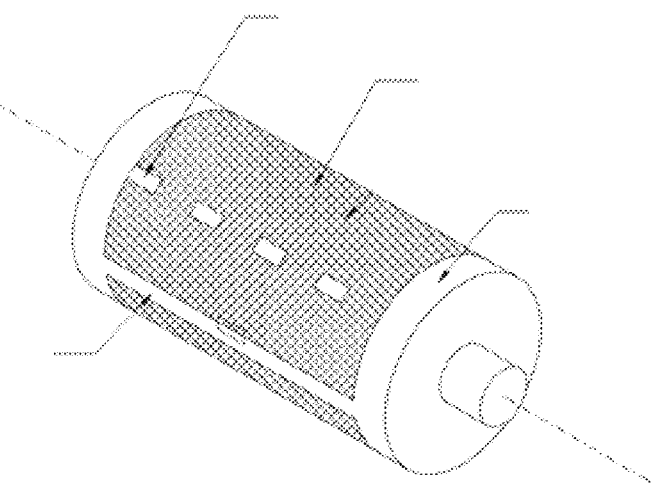
FIG. 3 is a schematic diagram of a gravure roller used in preparation of an electrode piece according to an embodiment of the present disclosure.

The electrode piece of the present disclosure can be prepared according to a conventional method in the field such as the coating method, and for example, in an embodi-ment, the preparation method thereof may specifically include: coating the bottom coating layer 2 on a surface of the current collector 1, and then coating the active material layer 3 on a surface of the bottom coating layer 2; then removing the bottom coating layer and also the active material layer at a preset tab position; then welding the tab on the current collector at the preset tab position, and according to the parameters such as width and thickness of the preset recessed area, removing the functional layer of the preset recessed area to form the recessed area 32, so as to obtain the electrode piece. Where, the gravure coating method is used to coat the bottom coating layer, as shown in FIG. 3, the gravure roller used in the gravure coating method are provided with the reserved tab position 9, and the preset tab position on the current collector 1 corresponds to a position of the reserved tab position 9 of the gravure roller: the active material layer can be coated by a conventional method such as transfer coating, extrusion coating or screen printing, or the active material layer can also be coated by gravure coating method. The coating layer at the preset tab position can be removed by a conventional method in this field, such as laser or scraper scrapping or combination of both.

In general, firstly, a slurry of the bottom coating layer can be coated on the current collector, and dried/baked (the temperature of baking can be controlled at 100-130° C., such as 110° C.) to form the bottom coating layer on the current collector, then a slurry of the active material layer is coated on the surface of the bottom coating layer, and after the coating is completed, it is dried (the temperature of drying can be 80-110° C.) and rolled, and then the functional layer of the preset recessed area is removed by step scraper, laser cleaning or other method, to form the recessed area, and all functional layers at the preset tab position are removed, to expose the current collector, and then the tab is welded on the current collector, to obtain the electrode piece. Where a solvent of the slurry can be a conventional solvent in the field, such as N-methyl pyrrolidone (NMP).

Specifically, as shown in FIG. 3, the gravure roller includes a roller body, and a surface of the roller body is provided with at least one coating area corresponding to coating layer of the electrode piece, and the coating area includes an engraved area 8 with an engraved mesh pattern and an nonengraved reserved tab position 9, and the rest is an nonengraved area (that is, a non-coated area) 10. The preset tab position is used for welding the tab, and the shape and size of the surface of the reserved tab position are the same as the shape and size of the bottom surface of the tab to be welded. The shape and size of the reserved tab position 9 can be set according to the shape and size of the tab to be welded. Usually, the shape of the reserved tab position is similar to the shape of the preset tab position, but the size of the reserved tab position is generally slightly larger than the size of the preset tab position.

The gravure coating machine formed by the gravure roller can specifically include a material trough for holding the coating slurry, a gravure roller located above the material trough, a rubber roller matched with the gravure roller (usually above the gravure roller), and a scraper matched with the gravure roller (usually located on a side of the gravure roller and pressed on the gravure roller); where the material trough, the rubber roller, the scraper and their positions are all conventional settings in the field and will not be repeated. In a specific implementation, the raw materials of the bottom coating layer can be placed in the solvent to form a coating slurry, and after the parameters or conditions such as pressure of the scraper, pressure of the rubber roller, coating speed and temperature of oven, are set, the above slurry is placed in the material trough of the gravure coating machine, to begin coating the substrate such as current collector; after the coating is completed, the bottom coating layer is formed on a substrate after drying, and a coil material coated with the bottom coating layer is obtained, and then the coil material is coated with the positive electrode active layer, and then rolled and cut into electrode sheets conforming to preset shape, size and other parameter. Specifically, conditions of the gravure coating can be as follows: coating speed is 10-30 m/min, for example, 20 m/min; pressure of the scraper is 0.2-0.6 MPa, such as 0.4 MPa; pressure of the rubber roller is 0.2-0.6 MPa, such as 0.4 MPa.

The preparation of the electrode piece by the above method can not only improve the safety, charging and discharging rate and other performance of the electrode piece, but also improve the manufacturing yield of the electrode piece, which is conducive to industrial production and application.

In another aspect of the present disclosure, there is also provided a battery, including the electrode piece above.

The battery of the present disclosure may include a positive electrode piece with the above structural design (that is, the electrode piece is a positive electrode piece), or a negative electrode piece with the above structural design (that is, the electrode piece is a negative electrode piece), or it can include both the positive electrode piece with the above structural design and the negative electrode piece with the above structural design (that is, the electrode piece includes both a positive electrode piece and a negative electrode piece). When the electrode piece is a negative electrode piece, the battery also includes a positive electrode piece, which may be a conventional positive electrode piece in the field. When the electrode piece is a positive electrode piece, the battery also includes a negative electrode piece, which may be a conventional negative electrode piece in the field. For example, in an embodiment, the negative electrode piece includes a negative electrode current collector and a negative electrode function layer located on the negative electrode current collector, a thickness of the negative electrode function layer can be 100-120 μm, and raw materials of the negative electrode function layer include a negative electrode active material, a binder, a dispersant and a conductive agent, where a mass content of the negative electrode active material can be 94-96%, a mass content of the binder can be 2-3.5%, a mass content of the dispersant can be 1.5-2.5%, a mass content of the conductive agent can be 1-2%; and the binder, the conductive agent, the negative electrode active material and the dispersant also can be conventional materials as described above.

The battery also includes a separator located between the positive electrode piece and the negative electrode piece. The separator is used for separating the positive electrode piece and the negative electrode piece and the separator can be a conventional separator in the field, without specific restriction in the present disclosure.

In general, an adhesive tape 5 is attached to a surface of the electrode piece provided with the tab, and the adhesive tape 5 is adhered to the tab 4 and at least part of the recessed area 32 around the tab 4 (the recessed area 32 near the tab), the tab 4 is located in a cavity surrounded and formed by the recessed area 32, the adhesive tape 5 and the current collector 1, and an upper surface of the adhesive tape 5 is located below a surface of the normal area 31, that is, distance H2 from the upper surface of the adhesive tape 5 to the surface of the normal area 31=thickness of the normal area 31−distance from the upper surface of the adhesive tape 5 to the surface of a side the current collector provided with the adhesive tape, H2>0.

In a preferred embodiment of the present disclosure, both surfaces of the current collector 1 are provided with the functional layer, the second surface is provided with an uncoated area 6 without coating layer, and the uncoated area 6 corresponds to a position of the tab 4 on the first surface. The functional layers on the both surfaces are provided with a recessed area 32, and the both surfaces are adhered with the adhesive tape 5. The adhesive tape 5 is adhered to the second surface in the same way as the first surface, that is, on the second surface, the adhesive tape 5 is adhered with at least part of the recessed area 32 surrounding the uncoated area 6 (the recessed area near the uncoated area), and the uncoated area 6 is located in a cavity surrounded by the recessed area 32, the adhesive tape 5 and the current collector 1, and the upper surface of the adhesive tape 5 is located below the surface of the normal area 32.

The present disclosure can adopt a conventional adhesive tape in the field, and in a preferred embodiment, a thickness of the adhesive tape can generally be 16-30 μm.

Figure 2:
FIG. 2 is a schematic structural diagram of a coiled cell of a battery according to an embodiment of the present disclosure.

As shown in FIG. 2, the battery may be a coiled lithium-ion battery, where the positive electrode piece with the positive electrode tab 4 and the negative electrode piece with a negative electrode tab 7 are separated by a separator, and there is no excessive-thickness phenomenon in an area near the tab.

The coiled battery can be prepared in accordance with a conventional method in the field, for example, a coiled lithium-ion battery may be prepared by laminating the positive electrode piece, the separator and the negative electrode piece and then subjecting to coiling, assembling, vacuum baking, liquid injection, resting, packaging, formation, capacity grading and other process. The coiling, assembling, vacuum baking, liquid injection, resting, packaging, formation and capacity grading can all be conventional procedures in the field, the separator and electrolyte used can all be conventional materials in this field and these will not be repeated.

In order to make the purpose, technical solution and advantages of the present disclosure more clear, the technical solution in the embodiment of the present disclosure will be described clearly and completely in combination with the examples of the present disclosure. Obviously, the described examples are part of the examples of the present disclosure, not all examples. Based on the examples of the present disclosure, all other examples obtained by those skilled in the field without creative work fall within the scope of the protection of the present disclosure.

Unless otherwise specified, in the following examples, the gravure coating machine used in the coating process using the gravure coating method includes: a material trough for holding the coating slurry, a gravure roller located above the material trough, a rubber roller matched with the gravure roller (usually above the gravure roller), and a scraper matched with the gravure roller (usually located on the side of the gravure roller and pressed on the gravure roller), where the gravure roller includes a roller body, and the surface of the roller body is provided with at least one coating area corresponding to a coating layer of the electrode piece, the coating area includes a normal area engraved with a mesh pattern and an unengraved reserved tab position, and the rest is uncoated area; when coating, the coating speed is controlled at 20 m/min; the pressure of the scraper is 0.4 MPa; and the pressure of the rubber roller is 0.4 MPa.

Example 1

The positive electrode piece in this embodiment includes a positive electrode current collector and a positive electrode functional layer coated on both surfaces of the positive electrode current collector, one surface of the positive electrode current collector is provided with a positive electrode tab (the positive electrode tab is located in middle of the positive electrode piece), and the positive electrode functional layer on the surface is composed of a normal area away from the positive electrode tab and a recessed area near the positive electrode tab, and a thickness of the recessed area is less than a thickness of the normal area. The other surface of the positive electrode current collector is provided with an uncoated area corresponding to a position of the positive electrode tab, and the positive electrode functional layer on the other surface is the same as the positive electrode functional layer of the surface provided with the positive electrode tab (i.e., it is also compose of a normal area and a recessed area); the positive electrode functional layers on the two surfaces above include a bottom coating layer and a positive electrode active material layer, the bottom coating layer is located between a surface of the positive electrode current collector and the positive electrode active material layer. Where, a thickness of the bottom coating layer in the recessed area is the same as a thickness of the bottom coating layer of the normal area, the thickness of the bottom coating layer is 5 μm, the thickness of the positive electrode active material layer in the recessed area is 45 μm, the thickness of the positive electrode active material layer in the normal area is 110 μm, depth of the recessed area is H1, equal to 65 μm, and the width of the recessed area is 30 mm; the porosity of the bottom coating layer is 28%, the porosity of the positive electrode active layer is 35%; and the positive electrode current collector is aluminum foil.

The positive electrode piece and the coiled lithium-ion battery formed by adopting the positive electrode piece are made according to the following process:

(1) lithium ferrous phosphate, polyvinylidene fluoride and carbon black were uniformly mixed in NMP in mass ratio of 65:30:5 to form a slurry of the bottom coating layer (with a solid content of 15%). The slurry of the bottom coating layer was placed in the material trough of the gravure coating machine, starting to coat, and the slurry of the bottom coating layer was coated on both surfaces of the aluminum foil, and then dried at 110° C. to obtain a coil material coated with the bottom coating layer;

lithium cobaltate, polyvinylidene fluoride and carbon black were evenly mixed in NMP in mass ratio of 97:1.3:1.4 to form a slurry of the positive electrode active layer, the slurry was coated on both surfaces of the coil material by a slit extrusion coating equipment, dried at 100° C. for 2-5 min, and then rolled and cut into a positive electrode piece precursor of 1000 mm×65 mm; after cleaning the coating layer on the preset tab position of the positive electrode piece precursor, the tabe was welded, to obtain a positive electrode piece;

(2) graphite, CMC, SBR and carbon black were evenly mixed in deionized water in mass ratio of 95:1.5:1.5:2, to form a slurry of negative electrode active layer, the slurry was coated on two surfaces of copper foil, dried for 2~5 min at 70° C.-100° C., and then rolled and cut into a negative electrode sheet of 1100 mm×66.5 mm; where a thickness of the negative electrode piece functional layer (a coating layer formed after drying and rolling the above slurry) was 120 μm; and (3) according to a conventional coiling process of lithium battery, a coiled battery was made by using the positive electrode piece and the negative electrode piece. Where, both surfaces of the positive electrode piece were adhered with an adhesive tape attached on, and on the surface provided with the positive electrode tab, the adhesive tape is adhered to the positive electrode tab, and the recessed area around the positive electrode tab, and the positive electrode tab is located in a cavity surrounded by the recessed area, the adhesive tape and the positive electrode current collector. The upper surface of the adhesive tape is located below the surface of the normal area, and on the surface provided with the uncoated area, the adhesive tape is bonded to the recessed area around the uncoated area. The uncoated area is located in the cavity surrounded by the recessed area, the adhesive tape and the positive electrode current collector, and the upper surface of the adhesive tape is below the surface of the normal area. The thickness of the adhesive tape used is 16 μm.

Example 2

The difference between this example and Example 1 is that the thickness of the bottom coating layer is 7 μm, the thickness of the positive electrode active material layer of the recessed area is 50 μm, and the depth of the recessed area is 60 μm, and the other conditions are the same as Example 1.

Example 3

The difference between this example and Example 1 is that the thickness of the bottom coating layer is 8 μm, the thickness of the positive electrode active material layer of the recessed area is 55 μm, and the depth of the recessed area is 55 μm, and the other conditions are the same as Example 1.

Example 4

The difference between this example and Example 1 is that the thickness of the bottom coating layer is 9 μm, the thickness of the positive electrode active material layer of the recessed area is 65 μm, and the depth of the recessed area is 45 μm, and the other conditions are the same as Example 1.

Example 5

The difference between this example and Example 1 is that the thickness of the bottom coating layer is 10 μm, the thickness of the positive electrode active material layer of the recessed area is 80 μm, and the depth of the recessed area is 30 μm, and the other conditions are the same as Example 1.

Example 6

The difference between this example and Example 1 is that the thickness of the bottom coating layer is 11 μm, the thickness of the positive electrode active material layer of the recessed area is 90 μm, and the depth of the recessed area is 20 μm, and the other conditions are the same as Example 1.

Example 7

The difference between this example and Example 1 is that the thickness of the bottom coating layer is 12 μm, the thickness of the positive electrode active material layer of the recessed area is 100 μm, and the depth of the recessed area is 10 μm, and the other conditions are the same as Example 1.

Example 8

The difference between this example and Example 1 is that the depth of the recessed area is 5 μm, the thickness of the positive electrode active material layer of the recessed area is 105 μm, and the other conditions are the same as Example 1.

Example 9

The difference between this example and Example 1 is that the width of the recessed area of the positive electrode piece is 50 mm, and the other conditions are the same as Example 1.

Comparative Example 1

The difference between this comparative example and Example 1 is that there is no bottom coating layer, the thickness of the recessed area is the same as the thickness of the normal area (that is, no recessed area is set), the tab is provided at an end of the positive electrode, and the other conditions are the same as Example 1.

Comparative Example 2

The difference between this comparative example and Example 1 is that the thickness of the recessed area is the same as the thickness of the normal area (that is, no recessed area is set), and the other conditions are the same as Example 1.

Performance Test

The battery internal resistance, 2C charging rate, excessive-thickness ratio of cell, and nail penetration pass rate of the lithium-ion batteries of Examples 1-9 and Comparative Examples 1-2 are measured, and as shown in Table 1, depth of recessed area, width of recessed area, thickness of bottom coating layer and capacity of battery in each Example and Comparative Example are also summarized in Table 1.

constant voltage, and then discharged to 3.0V at 0.2C and 2C, where 0.2C discharge capacity is recorded as C0, 2C discharging capacity as C2, and discharge capacity ratio=C2/C0.

(3) Excessive-Thickness Ratio of Cell

The excessive-thickness ratio of cell of each Example and Comparative Example is determined according to the following process: values of thickness of 200 cells are measured by a plane thickness meter (thickness of cell of each Example and Comparative Example is not more than 3.965 mm), the number of cell exceeding the specification limit (3.965+0.08 mm) is recorded as N, and the excessive-thickness ratio=N/50.

(4) Nail Penetration Pass Rate:

A lithium-ion battery is charged at 0.5C constant current to a voltage of 4.35V at room temperature, and then charged at a constant voltage until the current is 0.025C; the lithium-ion battery is transferred to a nail penetration test equipment, maintaining test ambient temperature of 25° C., and a steel nail with a diameter of 4 mm is used to pass through the negative electrode tab side of the lithium-ion battery at a distance of 7 mm from a side of cell at a constant speed of 30 mm/s, and retain for 300 s, and it is recorded as pass if the lithium-ion battery does not catch fire and does not explode. 5 lithium-ion batteries are tested for each Example/Comparative Example, and the pass rate of nail penetration test is used as an index to evaluate the safety of the lithium-ion batteries, where the pass rate of nail penetration test=the number of batteries passed the nail penetration test/the total number of batteries for the nail penetration test.

TABLE 1

| Example | Depth of recessed area/ μm | Width of recessed area/ mm | Capacity of cell/ mAh | Thickness of bottom coating layer/μm | Battery internal resistance/ mΩ | 2 C charging rate | 2 C discharging rate | Excessive-thickness ratio of cell | Pass rate of nail penetration |
|---|---|---|---|---|---|---|---|---|---|
| Example 1 | 65 | 30 | 3920 | 5 | 16.95 | 74.21% | 91.21% | 0% | 5/10 |
| Example 2 | 60 | 30 | 3872 | 7 | 17.01 | 74.16% | 90.86% | 0% | 6/10 |
| Example 3 | 55 | 30 | 3861 | 8 | 17.36 | 72.75% | 90.23% | 0% | 6/10 |
| Example 4 | 45 | 30 | 3849 | 9 | 17.64 | 69.92% | 90.05% | 0% | 7/10 |
| Example 5 | 30 | 30 | 3837 | 10 | 17.82 | 69.89% | 89.91% | 0% | 8/10 |
| Example 6 | 20 | 30 | 3825 | 11 | 18.10 | 68.54% | 89.54% | 10% | 8/10 |
| Example 7 | 10 | 30 | 3802 | 12 | 18.26 | 68.44% | 88.96% | 0% | 9/10 |
| Example 8 | 5 | 30 | 3806 | 5 | 16.91 | 68.82% | 88.86% | 4.5% | 6/10 |
| Example 9 | 65 | 50 | 3795 | 5 | 16.94 | 68.93% | 88.91% | 0% | 5/10 |
| Comparative Example 1 | 0 | / | 3805 | / | 31.52 | 65.21% | 82.65% | 5.8% | 0/10 |
| Comparative Example 2 | 0 | / | 3820 | 5 | 16.88 | 68.73% | 87.78% | 6.5% | 5/10 |

The test methods are as follows.

(1) Battery Internal Resistance:

When the cell is charged to 50% SOC, a 1 KHZ voltage internal resistance tester is used to detect the internal resistance of cell or battery.

(2) 2C Charging and Discharging Rate

Charging rate: under condition of 25° C.±5° C., a cell is discharged to 3.0V at 0.2C constant current, stands for 10 min, and then is charged to 4.35V at 2C constant current: then it is changed as constant voltage charging until the charging current is ≤0.02C; where the charging capacity in constant current stage is Cc1, the total charging capacity is C1, and the constant current charging ratio is Cc1/C1.

Discharging rate: under condition of 25° C.±5° C., the cell is discharged to 3.0V at 0.2C constant current, then charged to 4.35V cut-off voltage at 0.2C with constant current and As can be seen from the results of Table 1, compared with Comparative Examples 1 and 2, the excessive-thickness ratios of cells of the batteries of Examples 1-9 are very low, and most of them are 0, and at the same time, the batteries have higher pass rate of nail penetration, lower internal resistance of battery, higher capacity of cell, higher rate performance, and other advantage, and especially the batteries of Examples 1-9 have superior overall performance in capacity of cell, charging and discharging rate, and pass rate of nail penetration. More specifically, it can be seen from Examples 1-7 that the pass rate of nail penetration of the battery increases with the increase of the thickness of the bottom coating layer, indicating that the increase of thickness of the bottom coating layer has a significant effect on improvement of the safety of the battery, but if the thickness of the bottom coating layer is too high, it will affect the performance of the battery, such as internal resistance. As can be seen from Examples 1, 8 and 9, with the increase of the depth of the recessed area, the excessive-thickness ratio of the battery decreases, but if the recessed area is too large, it will affect the capacity of the battery, while if the depth of the recessed area is too low, the excessive-thickness ratio of the battery is slightly higher, that is, there is a relatively high risk of excessive-thickness. As can be seen from Example 1 and Comparative Examples 1-2, the design of the recessed area of the positive electrode piece can make the contact between the positive electrode piece, the separator and the negative electrode piece is closer in the cell formed by the coiling of the positive electrode piece, the separator and the negative electrode piece, which is beneficial to cell in reducing the internal resistance and improving the charging and discharging rate performance.

Therefore, the above results of Examples and Comparative Examples show that the present disclosure, by setting a specific recessed area at a positive electrode tab position, can effectively solve the problem of excessive thickness of cell and improve the safety of battery, and at the same time, improve the capacity, charging and discharging rate and other performance of battery.

What is claimed is:

1. An negative electrode piece, comprising a current collector and a functional layer located on a first surface of the current collector, wherein the first surface is provided with a tab, and the functional layer on the first surface is composed of a normal area away from the tab and a recessed area near the tab; the functional layer comprises an active material layer, and a thickness of the active material layer of the recessed area is less than a thickness of the active material layer of the normal area;

and an active material of the active material layer comprises at least one selected from the group consisting of graphite, mesocarbon microbead, soft carbon, hard carbon, silicon material, silicon oxide material, silicon carbon material and lithium titanate material;

an adhesive tape is provided on the surface of the tab facing away from the current collector, and the adhesive tape is adhered to at least a part of the recessed area; a gap is provided between the adhesive tape and the normal area along the length direction of the electrode piece; and a second surface of the current collector is opposite to the first surface, and the second surface is provided with an uncoated area; the uncoated area corresponds to the position of the tab of said first surface.

2. The negative electrode piece according to claim 1, wherein a width of the recessed area is 3-50 mm.

3. The negative electrode piece according to claim 1, wherein the thickness of the recessed area is 5-125 μm less than the thickness of the normal area.

4. The negative electrode piece according to claim 3, wherein a width of the recessed area is 3-50 mm.

5. The negative electrode piece according to claim 1, wherein the functional layer further comprises a bottom coating layer located between a surface of the current collector and the active material layer, wherein the bottom coating layer comprises an active material, a binder and a conductive agent, the active material layer comprises the active material, a binder and a conductive agent, and a content of the binder in the bottom coating layer is higher than a content of the binder in the active material layer.

6. The negative electrode piece according to claim 5, wherein a thickness of the bottom coating layer in the recessed area is 0-15 μm, and a thickness of an active material layer in the recessed area is 0-105 μm; and/or, a thickness of the bottom coating layer in the normal area is 5-15 μm, and a thickness of an active material layer in the normal area is 90-110 μm.

7. The negative electrode piece according to claim 5, wherein the active material layer is a porous structure with a porosity of 25%-50%.

8. The negative electrode piece according to claim 5, wherein the bottom coating layer is a porous structure with a porosity of 20%-45%.

9. The negative electrode piece according to claim 5, wherein the active material layer comprises the active material with a mass content of 93-96%, the binder with a mass content of 0.9-1.5%, and the conductive agent with a mass content of 1-3%.

10. The negative electrode piece according to claim 5, wherein the bottom coating layer comprises the active material with a mass content of 49-94%, the binder with a mass content of 4-50%, and the conductive agent with a mass content of 1-5%.

11. A battery, comprising the negative electrode piece according to claim 1.

12. The battery according to claim 11, wherein a width of the recessed area is 3-50 mm.

13. The battery according to claim 11, wherein the thickness of the recessed area is 5-125 μm less than the thickness of the normal area.

14. The battery according to claim 13, wherein a width of the recessed area is 3-50 mm.

15. The battery according to claim 11, wherein the functional layer comprises a bottom coating layer and an active material layer, the bottom coating layer is located between a surface of the current collector and the active material layer, materials for the bottom coating layer comprises an active material, a binder and a conductive agent; materials for the active material layer comprises an active material, a binder and a conductive agent, and a content of the binder in the bottom coating layer is higher than a content of the binder in the active material layer.

16. The battery according to claim 15, wherein a thickness of the bottom coating layer in the recessed area is 0-15 μm, and a thickness of an active material layer in the recessed area is 0-105 μm; and/or, a thickness of the bottom coating layer in the normal area is 5-15 μm, and a thickness of an active material layer in the normal area is 90-110 μm.

17. The battery according to claim 15, wherein the active material layer is a porous structure with a porosity of 25%-50%.

18. The battery according to claim 15, wherein the bottom coating layer is a porous structure with a porosity of 20%-45%.

19. The battery according to claim 15, wherein the materials for the active material layer comprise the active material with a mass content of 93-96%, the binder with a mass content of 0.9-1.5%, and the conductive agent with a mass content of 1-3%.

20. The battery according to claim 15, wherein the bottom coating layer comprises the active material with a mass content of 49-94%, the binder with a mass content of 4-50%, and the conductive agent with a mass content of 1-5%.

* * * * *